March 13, 1962 A. J. MARKO 3,025,507

REGISTER

Filed Nov. 29, 1960

INVENTOR
ALBERT J. MARKO
BY Theodore [signature]
ATTORNEY 3,025,507
Patented Mar. 13, 1962

3,025,507

REGISTER

Albert J. Marko, Deer Park, N.Y., assignor to General Telephone and Electronics Laboratories, Inc., a corporation of Delaware Filed Nov. 29, 1960, Ser. No. 72,444
10 Claims. (Cl. 340—324)

Figure 1:
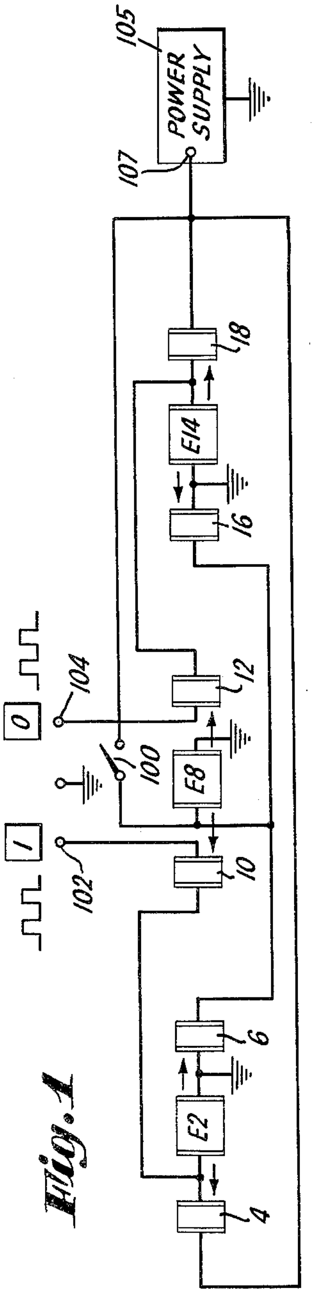

My invention is directed toward data storage devices.

Data storage devices, also known to the art as registers, are adapted to receive and store a collection of information units. Registers are widely used in data processing apparatus and in particular are widely used in electronic digital computers wherein the collection of units can represent a number in binary notation.

I have invented a new type of register wherein the information units are supplied thereto in the form of electrical signals and thereafter stored in a predetermined order, the stored collection being visually displayed as a pattern of illuminated and dark areas.

My register, which employs electroluminescent cells and photoconductive elements, uses no moving parts. It can be easily fabricated at low cost. Since certain of the cells and elements function jointly as bistable components which either emit light or are dark, my register is particularly adapted to receive, store, and display numbers in binary notation.

In accordance with the principles of my invention, my register includes one or more data storage stages to which operating voltages and incoming signals are supplied. These signals and voltages are fed to the stages through switching means and first, second, third and fourth terminals.

Each stage includes first, second and third electroluminescent cells, and first, second and third photoconductive elements. The two elements in each of the three sets are optically coupled to a corresponding one of the three electroluminescent cells.

The first element in each of the first and third sets is connected in series with a corresponding one of the first and third cells between the third and fourth terminals. The first element in the second set is connected in series with the first cell between the first and fourth terminals. The second element in the second set is connected in series with the third cell between the second and fourth terminal. The second elements in the first and third sets are connected in parallel with the second cell, and this parallel combination is connected in series with the switching means between the third and fourth terminals. A two terminal power supply is coupled between the third and fourth terminals.

This stage is then operated in the following manner. First, the switching means is actuated to connect the power supply across the second electroluminescent cell which then emits light. The two photoconductive elements in the second set are then irradiated with light and are triggered into the illuminated, low impedance state. At this point, the first and third electroluminescent cells are dark and consequently, the photoconductive elements in the first and third sets are in the dark, high impedance state.

A first train of pulses which, for example, represent binary ones, is applied between the first and fourth terminals. A second train of pulses which, for example, represent binary zeros, is applied between the second and fourth terminals. The pulses in the two trains are not in time coincidence so that pulses in the two trains cannot arrive at the corresponding terminals at the same time. Then, if the first pulse to arrive at either terminal pair is in the first train, this pulse passes through the low impedance represented by the first element in the second set to the first electroluminescent cell, causing this cell to emit light. This light irradiates the first element in the first set. This first set element is then triggered to the low impedance state and connects the first cell to the power supply. The first cell will then remain illuminated until the switching means is deactivated. At the same time, the light emitted from the first cell irradiates the second element in the first set. This first set element then is triggered into the low impedance state, effectively short circuiting and extinguishing the second electroluminescent cell. Thus, a binary one has been stored in the stage, as indicated by the lit first electroluminescent cell and the dark second and third electroluminescent cells. Any additional pulses in either train will have no influence upon this stage as long as the switching means remain actuated; the stage can only be cleared by deactivating the switching means.

If the first pulse to arrive at either terminal pair is in the second train, the same type of operation ensues. However, under these circumstances, the third cell is lit to indicate storage of a binary zero, while the first and second electroluminescent cells are dark.

This stage thus stores one binary digit. Consequently, the register capacity varies directly with the number of stages used. All additional stages are identical with the stage previously described and are connected in parallel with this stage to the four terminals and the switching device. Further, however, I provide interstage coupling means functioning in such manner that the incoming information is automatically supplied to the appropriate stage, i.e. to insure that the first incoming binary digit is stored in the first stage, the second digit is stored in the second stage and, in general, the Nth digit is stored in the Nth stage.

Figure 2:
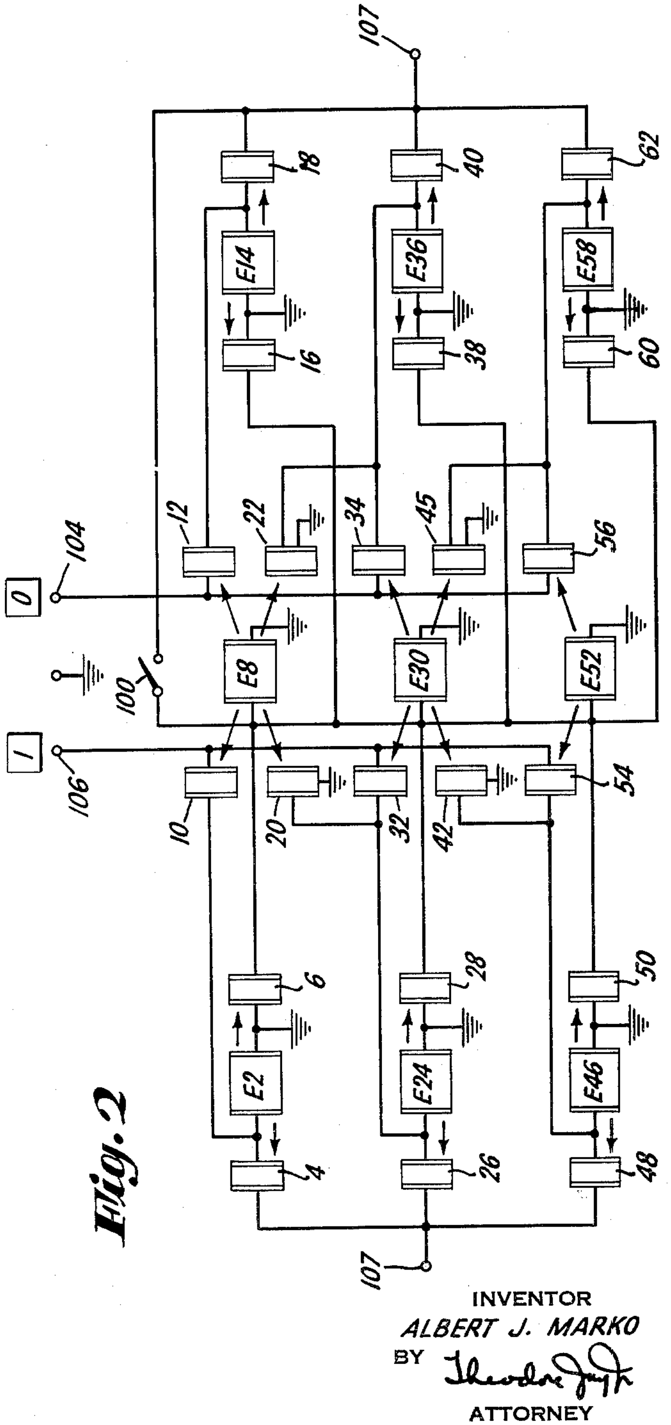

Illustrative embodiments of my invention will now be described in detail with reference to the accompanying drawings wherein FIG. 1 shows a one stage register in accordance with my invention; and FIG. 2 shows a three stage register in accordance with my invention.

Referring now to FIG. 1 there is shown three electroluminescent cells E2, E8 and E14. Each cell comprises two spaced apart transparent electrodes and an electroluminescent layer subtended therebetween. When a voltage is applied across any of these cells, the electroluminescent layer emits light which passes through both electrodes. A set of two separate photoconductive elements is optically coupled to each of the electroluminescent cells. For example, elements 4 and 6 are coupled to cell 2; elements 10 and 12 are coupled to cell 8, and elements 16 and 18 are coupled to cell 14. Each of these elements consists of two spaced apart electrodes, at least one of which is transparent and a photoconductive layer subtended therebetween. Each element has the property of exhibiting a very high electrical impedance when in the dark and a low electrical impedance when illuminated. One electrode of each of the electroluminescent cells 2, 8 and 14 and each of elements 16 and 6 is grounded. The other electrodes of cell 8 and elements 6 and 16 are connected in common through a switch 100 to the high voltage terminal 107 of power supply 105 (the other side of this power supply is grounded). Element 4 and cell 2 are connected in series between terminal 107 and ground. Cell 14 and element 18 are connected to the power supply in like manner. The junction of cell 2 and element 4 is connected through element 10 to terminal 102. The junction of cell 14 and element 18 is connected through element 12 to terminal 104.

This device works in the following manner. When switch 100 is closed, cell 8 is energized and emits light. As a consequence, elements 10 and 12 are triggered into the low impedance state. At this point cells 2 and 14 are dark and, consequently, elements 4, 6, 16 and 18 are in the high impedance state. A first pulse train consisting of a series of rectangular shaped pulses which may or may not be equidistantly spaced is applied between terminal 102 and ground. A second like pulse train is applied between terminal 104 and ground. (The timing of these pulses is such that pulses in each train will not arrive at the corresponding terminals in time coincidence.) If the first pulse to arrive at the stage appears between terminal 102 and ground, this pulse passes through the low impedance element 10 to cell 2 and energizes same. The light emitted from this cell triggers element 4 into its low impedance state, thereby connecting cell 2 to the power supply. Cell 2 will then remain energized until switch 100 is opened. At the same time, element 6 is triggered into its low impedance state and effectively short circuits cell 8 which is then extinguished. At this point a binary digit has been stored in the stage; additional pulses supplied to either terminal 102 or 104 will have no effect on the stage. Assuming that the pulses arriving at terminal 102 are designated as binary ones, then the lit state of cell 2 signifies that a binary 1 has been stored in the stage. If the first pulse to arrive at the stage appears at terminal 104, then cell 14 will be lit, and the remaining cells will be extinguished. If the pulses arriving at terminal 104 are designated as binary zeros, then the storage of a binary zero in the stage is signified by the lit state of cell 14.

FIG. 2 shows a multi-stage register for storing N digits, N in this example being equal to 3. Each of the stages in the device of FIG. 2 is identical with the single stage of FIG. 1 and is connected to the power supply, the switching means and the pulse receiving terminals in the same manner as in FIG. 1. However, as previously indicated, interstage coupling means are required for a multi-stage register to ensure that the proper information is supplied to the proper stage. This is accomplished by interposing two photoconductive elements 20 and 22 between the first and second stages and also interposing two additional photoconductive elements 42 and 45 between the second and third stages. Elements 20 and 22 are optically coupled to electroluminescent cell 8 in the first stage. Element 20 is coupled to the junction of electroluminescent cell 24 and photoconductive element 26 in the second stage, while element 22 is coupled to the junction of element 40 and cell 36 in the second stage. Similarly, elements 42 and 45 are optically coupled to electroluminescent cell 30 in the second stage, element 42 being connected between the junction of element 48 and cell 46 in the third stage and ground, while element 45 is coupled to the junction between cell 58 and element 62 of the third stage and ground.

This system works as follows. With switch 100 closed, cells 8, 30 and 52 (i.e. the middle electroluminescent cell in each of the stages) are energized and emit light. The first pulse arriving at either terminal 106 or 104 will energize either cell 2 or cell 14 in the manner previously indicated. Due to the low impedance state of the photoconductive elements 20, 22, 42 and 45, this pulse will have no effect on any electroluminescent cells in the second or third stages, since the only cells which could respond to this pulse, i.e. cells 24, 36, 46 and 58, are effectively short circuited.

However, when either cell 2 or 14 is energized and emits light, cell 8 is extinguished. Consequently, elements 20 and 22 are triggered into the high impedance state and cells 24 and 36 are no longer short circuited. The arrival of the next pulse at either of terminals 106 or 104 will energize one or the other of cells 24 and 36, thereby storing the second incoming binary digit in the second stage. As before, after either of cells 24 or 36 is energized, cell 30 is extinguished and elements 42 and 45 are triggered into the high impedance thus removing the short circuit from cells 46 and 58. Then the third pulse which arrives at either terminal 106 or 104 will energize either cell 46 or 58 thus storing the third binary digit in the third stage as desired. The register is then filled. It can be cleared by opening switch 100 or by disconnecting terminal 107 or the ground terminal from the power supply.

The power supply 105 should have a low internal impedance. When desired, a current limiting resistor can be interposed between terminal 107 and the various register stages connected to this terminal.

What is claimed is:

1. An electroluminescent device comprising first, second and third electroluminescent cells, and first, second and third sets, each set including first and second photoconductive elements, each of said sets being optically coupled to a corresponding one of said cells, one element in each of said first and third sets being connected in series with a corresponding one of said first and third cells, the other element in each of said first and third sets being connected in parallel with said second cell, one element in the second set being connected in series with the first cell, the other element in the second set being connected in series with the third cell.

2. An electroluminescent device comprising first, second and third electroluminescent cells, each electroluminescent cell having first and second spaced apart electrodes and an electroluminescent layer between said electrodes; first, second and third sets, each set including first and second photoconductive elements, each element having first and second spaced apart conductors and a photoconductive layer between said conductors, each of said sets being optically coupled to a corresponding one of said electroluminescent cells; first means interconnecting one electrode of each cell to one conductor of the second element of said first set and one conductor of the first element of said third set; second means connecting the other electrode of said first cell to the other electrode of the second element of said first set, the other electrode of the first element of said third set, one electrode of the first element of the first set and one electrode of the second element of said third set; third means interconnecting the first electroluminescent cell, the other cell in the second set being connected in series with the third electroluminescent cell.

3. An electroluminescent device comprising first, second and third electroluminescent cells, each cell having an electroluminescent layer and first and second spaced apart electrodes secured to said layer; first, second and third sets, each set including first and second photoconductive elements, each element having a photoconductive layer and first and second spaced apart conductors secured to said layer, each of said sets being optically coupled to a corresponding one of said cells; first means interconnecting one electrode of each of said cells, one conductor of one element in said first set and one conductor of one element in said third set; second means interconnecting the other electrode of said second cell, the other conductor of said one first set element and the other conductor of said third set element; third means interconnecting the other electrode of the first cell, one conductor of one element in the second set and one conductor of the other first set element; fourth means interconnecting the other electrode of said third cell, one conductor of the other second set element and one conductor of the other third set element; a first terminal connected to the other conductor of said one second set element; a second terminal connected to the other conductor of said other second set element; a third terminal connected to said first means; a fourth terminal connected to the other conductor of each of said other first set element and said other third set element; and switching means interposed between said fourth terminal and said second means.

4. An electroluminescent device comprising first, second and third electroluminescent cells, each cell having an electroluminescent layer and first and second spaced apart electrodes secured to said layer; first, second and third sets, each set including first and second photoconductive elements, each element having a photoconductive layer and first and second spaced apart conductors secured to said layer, each of said sets being optically coupled to a corresponding one of said cells; first means interconnecting one electrode of each of said cells, one conductor of one element in said first set and one conductor of one element in said third set; second means interconnecting the other electrode of said second cell, the other conductor of said one first set element and the other conductor of said third set element; third means interconnecting the other electrode of the first cell, one conductor of one element in the second set and one conductor of the other first set element; fourth means interconnecting the other electrode of said third cell, one conductor of the other second set element and one conductor of the other third set element; a first terminal connected to the other conductor of said one second set element; a second terminal connected to the other conductor of said other second set element; a third terminal connected to said first means; a fourth terminal connected to the other conductor of each of said other first set element and said other third set element; switching means interposed between said fourth terminal and said second means; and a power supply coupled between said third and fourth terminals.

5. An electroluminescent device comprising first, second and third electroluminescent cells, each cell having an electroluminescent layer and first and second spaced apart electrodes secured to said layer; first, second and third sets, each set including first and second photoconductive elements, each element having a photoconductive layer and first and second spaced apart conductors secured to said layer, each of said sets being optically coupled to a corresponding one of said cells; first means interconnecting one electrode of each of said cells, one conductor of one element in said first set and one conductor of one element in said third set; second means interconnecting the other electrode of said second cell, the other conductor of said one first set element and the other conductor of said third set element; third means interconnecting the other electrode of the first cell, one conductor of one element in the second set and one conductor of the other first set element; fourth means interconnecting the other electrode of said third cell, one conductor of the other second set element and one conductor of the other third set element; a first terminal connected to the other conductor of said one second set element; a second terminal connected to the other conductor of said other second set element; a third terminal connected to said first means; a fourth terminal connected to the other conductor of each of said other first set element and said other third set element; switching means interposed between said fourth terminal and said second means; a power supply coupled between said third and fourth terminals; and means to apply pulses between on of said first and second terminals and said fourth terminal.

6. An electroluminescent device comprising first and second stages, each stage including first, second and third electroluminescent cells, and first, second and third sets, each set including first and second photoconductive element, each of said sets being optically coupled to a corresponding one of said electroluminescent cells, one element in each of said first and third sets being connected in series with a corresponding one of said first and third electroluminescent cells, the other element in each of said first and third sets being connected in parallel with said second electroluminescent cell, one element in the second set being connected in series with the first electroluminescent cell, the other element in the second set being connected in series with the third electroluminescent cell; and first and second photoconductive cells optically coupled to the second cell in the first stage, the first photoconductive cell being connected between the second electroluminescent cell in the first stage and the junction of the first electroluminescent cell in the second stage and the said one second set element in the second stage, the second photoconductive cell being connected between the second electroluminescent cell in the first stage and the junction of the third electroluminescent cell in the second stage and the said other second set element in the second stage.

7. An electroluminescent device comprising first, second and third electroluminescent cells, and first, second, and third sets, each set including first and second photoconductive elements, each of said sets being optically coupled to a corresponding one of said cells, the first element in each of said first and third sets being connected in series with a corresponding one of said first and third cells, the second element in each of said first and third sets being connected in parallel with said second cell, the first element in the second set being connected in series with the first cell, the second element in the second set being connected in series with the third cell.

8. An electroluminescent register comprising N different stages arranged in a linear array, N being any integer, each stage including first, second and third electroluminescent cells, and first, second and third sets, each set including first and second photoconductive elements, each of said sets being optically coupled to a corresponding one of said electroluminescent cells, the first element in each of said first and third sets being connected in series with a corresponding one of said first and third electroluminescent cells, the second element in each of said first and third sets being connected in parallel with said second electroluminescent cell, the first element in the second set being connected in series with the first electroluminescent cell, the second element in the second set being connected in series with the third electroluminescent cell; and (N–1) different groups, each group including first and second photoconductive cells, each stage other than the last stage in the array being associated with a corresponding group, both photoconductive cells in any group being optically coupled to the second electroluminescent cell in the corresponding stage, the first photoconductive cell in said any group being connected between the second electroluminescent cell in the corresponding stage and the junction, in the stage following the corresponding stage, of the first element in the first set and the first cell, the second photoconductive cell in said any group being connected between the second electroluminescent cell in the corresponding stage and the junction, in the stage following the corresponding stage, of the first element in the third set and the third cell.

9. An electroluminescent device comprising first, second, third and fourth terminals; first, second and third electroluminescent cells; first, second and third sets, each set including first and second photoconductive elements, each of said sets being optically coupled to a corresponding one of said cells, the element in each of said first and third sets being connected, in series with a corresponding one of said first and third cells, between said third and fourth terminals, the second element in each of said first and third sets being connected in parallel with said second cell, the element in the second set being connected, in series with the first cell, between said first and fourth terminals, the second element in the second set being connected, in series with the third cell, between said second and fourth terminals; and switching means connected, in series with the second cell, between said third and fourth terminals.

10. A register comprising N different identical information storage stages, said stages being connected in parallel, each stage including first, second and third electroluminescent cells, and first, second and third sets, each set including first and second photoconductive elements, each of said sets being optically coupled to a corresponding one of said cells, one element in each of said first and third sets being connected in series with a corresponding one of said first and third cells, the other element in each of said first and third sets being connected in parallel with said second cell, one element in the second set being connected in series with the first cell, the other element in the second set being connected in series with the third cell; and interstage coupling means interposed between each two adjacent stages, said means being optically coupled to the first of said adjacent stages and electrically coupled to the second of said adjacent stages.

No references cited.